United States Patent [19]

Saotome

[11] Patent Number: 5,726,766

[45] Date of Patent: Mar. 10, 1998

[54] INTERPOLATING OPERATION METHOD AND APPARATUS FOR IMAGE SIGNALS

[75] Inventor: Shigeru Saotome, Kanagawa-ken, Japan

[73] Assignee: Fuji Photo Film Co., Ltd., Kanagawa, Japan

[21] Appl. No.: 678,612

[22] Filed: Jul. 15, 1996

[30] Foreign Application Priority Data

Jul. 13, 1995 [JP] Japan ................... 7-177014
Jul. 13, 1995 [JP] Japan ................... 7-177015

[51] Int. Cl.$^6$ ................... H04N 1/41; G06K 9/32
[52] U.S. Cl. ................... 358/428; 358/451; 358/447; 382/298; 382/300
[58] Field of Search ................... 358/451, 428, 358/447, 448, 493, 528; 382/267, 268, 270, 298, 300; 250/909; 348/443, 445

[56] References Cited

U.S. PATENT DOCUMENTS

| | | | |
|---|---|---|---|
| 4,876,509 | 10/1989 | Perlmutter | 324/309 |
| 4,991,029 | 2/1991 | Motoki | 358/451 |
| 4,992,664 | 2/1991 | Shimura et al. | 250/327.2 |
| 5,046,117 | 9/1991 | Yamashita | 382/300 |
| 5,046,147 | 9/1991 | Funahashi et al. | 250/327.2 |
| 5,151,596 | 9/1992 | Saotome | 250/327.2 |
| 5,189,529 | 2/1993 | Ishiwata | 358/451 |
| 5,202,670 | 4/1993 | Oha | 358/451 |
| 5,307,264 | 4/1994 | Waggener et al. | 364/413.21 |

*Primary Examiner*—Edward L. Coles, Sr.
*Assistant Examiner*—Madeleine AV Nguyen
*Attorney, Agent, or Firm*—Sughrue, Mion, Zinn, Macpeak & Seas, PLLC

[57] ABSTRACT

An original image signal, which represents an original image and is made up of a series of original image signal components representing picture element values of picture elements arrayed at predetermined intervals and in a lattice-like form, is obtained. One of different interpolating operation processes is carried out on the original image signal and in accordance with an image size enlargement scale factor with respect to the original image, which is represented by the original image signal. An interpolation image signal is obtained from the interpolating operation process, which signal is made up of a series of image signal components, which occur at intervals different from those of the original image signal components. The response of an interpolation image, which is reproduced from the interpolation image signal and displayed on an image reproducing apparatus, is kept to be approximately equal to a predetermined level regardless of the image size enlargement scale factor.

36 Claims, 3 Drawing Sheets

INTERPOLATING OPERATION METHOD AND APPARATUS FOR IMAGE SIGNALS

BACKGROUND OF THE INVENTION

1. Field of the Invention

This invention relates to an interpolating operation method and apparatus for an image signal. This invention particularly relates to an interpolating operation method and apparatus for an image signal, wherein an interpolating operation process is carried out such that the response of a resulting interpolation image may be kept to be approximately equal to a predetermined level regardless of the image size enlargement scale factor with respect to an original image. This invention also relates to an interpolating operation method and apparatus for an image signal, wherein interpolating operation processes are carried out such that responses of a reproduced visible image along X and Y directions may become approximately equal to each other.

2. Description of the Prior Art

Techniques for photoelectrically reading out an image, which has been recorded on a photographic film, in order to obtain an image signal, carrying out appropriate image processing on the image signal, and then reproducing a visible image by use of the processed image signal have heretofore been known in various fields. Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image, which has good image quality and can serve as an effective tool in, particularly, the efficient and accurate diagnosis of an illness.

In image recording and reproducing systems, in which an image signal is obtained in the manner described above and a visible is reproduced from the image signal, in cases where the region of interest in the visible image is to be viewed in more detail, the region of interest is often enlarged and reproduced. In such cases, the visible image can be obtained by carrying out a predetermined interpolating operation process on the original image signal, which has been obtained by reading out an original image, such that an interpolation image signal, which is a secondary image signal and is made up of a number of image signal components different from that of the original image signal, may be formed, and thereafter reproducing the visible image from the interpolation image signal.

As the interpolating operation methods for image signals, there have theretofore been proposed various methods, such as linear interpolating operation methods, methods using second-order spline interpolating functions, and methods using third-order spline interpolating functions. For example, in a cubic spline interpolating operation, which uses a third-order spline interpolating function, it is necessary that the spline interpolating function passes through the original sampling points (picture elements), and that the first-order differential coefficient of the spline interpolating function is continuous between adjacent sections. The cubic spline interpolating operation is utilized in order to obtain a secondary image (i.e., an interpolation image obtained from the interpolating operation) which has a comparatively high sharpness. Also, a B spline interpolating operation is known, which is utilized in order to obtain an interpolation image signal representing a secondary image, which has a comparatively low sharpness and is smooth. In cases where a secondary image having a high sharpness is to be reproduced, the cubic spline interpolating operation may be utilized. In cases where a secondary image, which has a comparatively low sharpness and is smooth, is to be reproduced, the B spline interpolating operation may be utilized.

However, when the interpolation image signal is fed into an image reproducing apparatus and the interpolation image is reproduced as a visible image, the response of the reproduced interpolation image varies in accordance with the image size enlargement scale factor with respect to the original image. Specifically, as the image size is enlarged with a larger enlargement scale factor, the response of high frequency components of the image becomes lower, and the image blurs to a higher extent. Therefore, even if the image is enlarged in order for the region of interest in the image to be viewed in more detail, the problems will often occur in that the image becomes imperceptible, and the necessary image information cannot be obtained from the image.

Also, as an apparatus for reproducing the interpolation image from the interpolation image signal, an apparatus is ordinarily used which is constituted to reproduce an image by operations for scanning along X and Y directions. Examples of such image reproducing apparatuses include a cathode ray tube (CRT) display device, a thermal recording apparatus utilizing a thermal head, and a light beam scanning recording apparatus. However, in cases where the image reproducing apparatus of this type is used, the problems have heretofore been encountered in that the responses along X and Y directions become different from each other, and the feeling given by the object in the image varies for different directions. It is considered that the aforesaid problems occur due to a difference between the responses of the image reproducing apparatus along the X and Y directions.

In such cases, the sharpness along the direction, in which the response is low, can be kept high by emphasizing the sharpness of the reproduced image. However, in such cases, it often occurs that the frequency emphasis becomes excessive with respect to the direction, in which the response is high, and an artifact occurs in the reproduced image.

SUMMARY OF THE INVENTION

The primary object of the present invention is to provide an interpolating operation method for an image signal, wherein an interpolating operation process is carried out such that the response of an interpolation image, which is represented by an interpolation image signal, may be kept to be approximately equal to a predetermined level regardless of the image size enlargement scale factor with respect to an original image.

Another object of the present invention is to provide an interpolating operation method for an image signal, wherein interpolating operation processes are carried out such that responses of an interpolation image, which is reproduced by an image reproducing apparatus, along X and Y directions may become approximately equal to each other.

A further object of the present invention is to provide an apparatus for carrying out the interpolating operation method for an image signal.

The present invention provides a first interpolating operation method for an image signal, comprising the steps of:

i) obtaining an original image signal, which represents an original image and is made up of a series of original image signal components representing picture element values of picture elements arrayed at predetermined intervals and in a lattice-like form, ii) carrying out an interpolating operation process on the original image signal components and in accordance with an image size enlargement scale factor with respect to the original image, which is represented by the original image signal, an interpolation image signal being obtained from the interpolating operation process, the interpolation image signal being made up of a series of image signal components, which occur at intervals different from those of the original image signal components, and iii) feeding the interpolation image signal into an image reproducing apparatus, wherein one of different interpolating operation processes is carried out on the original image signal and in accordance with the image size enlargement scale factor, and the response of an interpolation image, which is reproduced from the interpolation image signal and displayed on the image reproducing apparatus, is thereby kept to be approximately equal to a predetermined level regardless of the image size enlargement scale factor.

The present invention also provides a first interpolating operation apparatus for an image signal, comprising:

i) a means for receiving an original image signal, which represents an original image and is made up of a series of original image signal components representing picture element values of picture elements arrayed at predetermined intervals and in a lattice-like form, ii) an interpolating operation processing means for carrying out an interpolating operation process on the original image signal and in accordance with an image size enlargement scale factor with respect to the original image, which is represented by the original image signal, an interpolation image signal being obtained from the interpolating operation process, the interpolation image signal being made up of a series of image signal components, which occur at intervals different from those of the original image signal components, and iii) a means for feeding the interpolation image signal into an image reproducing apparatus, wherein the interpolating operation processing means carries out one of different interpolating operation processes on the original image signal and in accordance with the image size enlargement scale factor, and thereby keeps the response of an interpolation image, which is reproduced from the interpolation image signal and displayed on the image reproducing apparatus, to be approximately equal to a predetermined level regardless of the image size enlargement scale factor.

The present invention further provides a second interpolating operation method for an image signal, comprising the steps of:

i) obtaining an original image signal, which represents an original image and is made up of a series of original image signal components representing picture element values of picture elements arrayed at predetermined intervals and along X and Y directions in a lattice-like form, ii) carrying out interpolating operation processes on the original image signal, an interpolation image signal being obtained from the interpolating operation processes, the interpolation image signal being made up of a series of image signal components, which occur at intervals different from those of the original image signal components, and iii) feeding the interpolation image signal into an image reproducing apparatus, which reproduces an image by an operation for scanning along the X and Y directions, wherein different interpolating operation processes are carried out with respect to the X and Y directions and in accordance with a difference between responses of the image reproducing apparatus along the X and Y directions, and the ultimate responses of an interpolation image, which is reproduced from the interpolation image signal and displayed on the image reproducing apparatus, along the X and Y directions are thereby kept to be approximately equal to each other.

The present invention still further provides a second interpolating operation apparatus for an image signal, comprising:

i) a means for obtaining an original image signal, which represents an original image and is made up of a series of original image signal components representing picture element values of picture elements arrayed at predetermined intervals and along X and Y directions in a lattice-like form, ii) a means for carrying out interpolating operation processes on the original image signal, an interpolation image signal being obtained from the interpolating operation processes, the interpolation image signal being made up of a series of image signal components, which occur at intervals different from those of the original image signal components, and iii) a means for feeding the interpolation image signal into an image reproducing apparatus, which reproduces an image by an operation for scanning along the X and Y directions, wherein the interpolating operation processing means carries out different interpolating operation processes with respect to the X and Y directions and in accordance with a difference between responses of the image reproducing apparatus along the X and Y directions, and thereby keeps the ultimate responses of an interpolation image, which is reproduced from the interpolation image signal and displayed on the image reproducing apparatus, along the X and Y directions to be approximately equal to each other.

With the first interpolating operation method and apparatus for an image signal in accordance with the present invention, when an interpolating operation process is carried out on the original image signal, one of different interpolating operation processes is carried out in accordance with the image size enlargement scale factor. In this manner, the response of the interpolation image, which is reproduced on the image reproducing apparatus, is kept to be approximately equal to a predetermined level regardless of the image size enlargement scale factor. Therefore, even if the image size enlargement scale factor with respect to the original image varies, the responses of interpolation images displayed on the image reproducing apparatus can be kept to be approximately equal to each other regardless of the image size enlargement scale factors. Accordingly, the problems can be prevented from occurring in that the response of the reproduced interpolation image varies for different image size enlargement scale factors, and in that the reproduced interpolation image becomes imperceptible.

With the second interpolating operation method and apparatus for an image signal in accordance with the present invention, different interpolating operation processes are carried out with respect to the X and Y directions of the image reproducing apparatus. In this manner, the difference between the responses of the image reproducing apparatus along the X and Y directions is compensated for. Therefore, the ultimate responses of the reproduced interpolation image along the X and Y directions can be kept to be approximately equal to each other.. Accordingly, the balance of the responses along the X and Y directions can be prevented from varying. Also, the problems can be prevented from occurring in that the frequency emphasis processing becomes excessive with respect to one of the X and Y directions, and in that an artifact is thereby caused to occur in the reproduced image.

The first interpolating operation method and for an image signal in accordance with the present invention and the second interpolating operation method and apparatus for an image signal in accordance with the present invention are particularly suitable for the radiation image recording and reproducing system, in which the stimulable phosphor sheet is utilized. In such cases, a visible reproduced radiation image can be obtained, which has good image quality and can serve as an effective tool in, particularly, the efficient and accurate diagnosis of an illness. However, the first interpolating operation method and for an image signal in accordance with the present invention and the second interpolating operation method and apparatus for an image signal in accordance with the present invention are also applicable to systems other than this type of radiation image recording and reproducing system. In such cases, the same effects as those described above can be obtained.

DESCRIPTION OF THE PREFERRED EMBODIMENTS

The present invention will hereinbelow be described in further detail with reference to the accompanying drawings.

Figure 1:
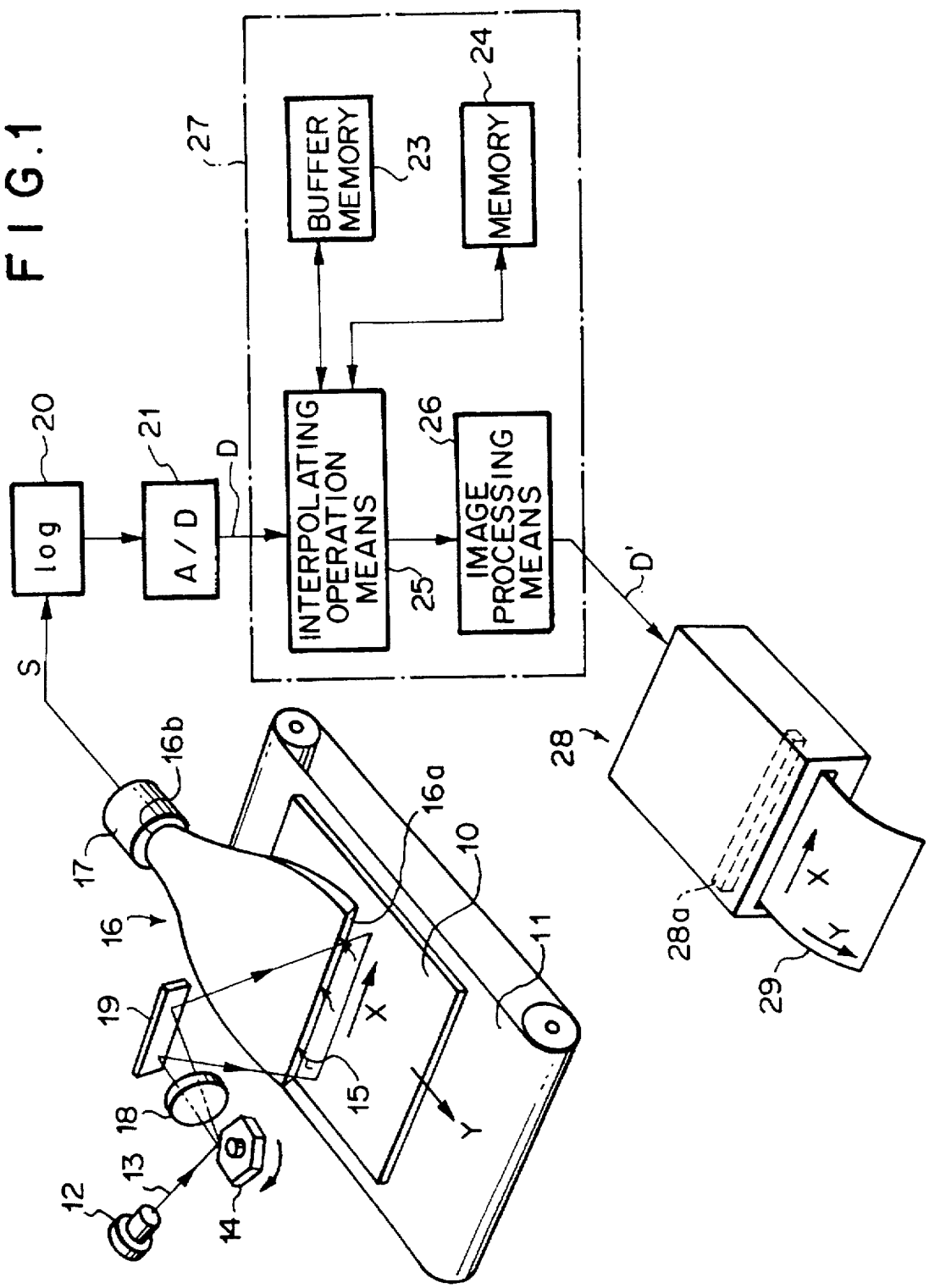
FIG. 1 is a schematic view showing an example of a radiation image read-out and reproducing system, in which an embodiment of the apparatus for carrying out the first interpolating operation method for an image signal in accordance with the present invention is employed.

FIG. 1 is a schematic view showing an example of a radiation image read-out and reproducing system, in which an embodiment of the apparatus for carrying out the first interpolating operation method for an image signal in accordance with the present invention is employed. In the radiation image read-out and reproducing system, a radiation image is read out from a stimulable phosphor sheet, on which the radiation image has been stored, and an image signal representing the radiation image is thereby obtained. Also, from the obtained image signal, a visible image is reproduced by a thermal recording apparatus.

With reference to FIG. 1, a stimulable phosphor sheet 10 has been exposed to radiation, such as X-rays, which has passed through an object. A radiation image of the object has thereby been stored on the stimulable phosphor sheet 10. The stimulable phosphor sheet 10, on which the radiation image has been stored, is then conveyed in a sub-scanning direction indicated by the arrow Y by a sheet conveyance means 11. The sheet conveyance means 11 may be constituted of an endless belt, or the like. A laser beam 13, which serves as stimulating rays (reading light), is produced by a stimulating ray source 12, such as a semiconductor laser, and is deflected by a rotating polygon mirror 14, which is rotated quickly. The laser beam 13 is then converged by a scanning lens 18, which is ordinarily constituted of an fθ lens. Thereafter, the laser beam 13 is reflected by a mirror 19, and is caused to scan the stimulable phosphor sheet 10 in a main scanning direction indicated by the double headed arrow X, which direction is approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is guided by a light guide member 16 and photoelectrically detected by a photomultiplier 17, which serves as a photodetector.

The light guide member 16 is made from a light guiding material such as an acrylic plate and has a linear light input face 16a, positioned so that it may extend along the main scanning line on the stimulable phosphor sheet 10, and a ring-shaped light output face 16b, positioned so that it may be in close contact with a light receiving face of the photomultiplier 17. The emitted light 15, which has entered the light guide member 16 at its light input face 16a, is guided through repeated total reflection inside of the light guide member 16, emanates from the light output face 16b, and is received by the photomultiplier 17. In this manner, the amount of the emitted light 15, which amount represents the radiation image, is converted into an electric signal by the photomultiplier 17.

In the manner described above, an analog output signal (image signal) S is generated by the photomultiplier 17. The analog output signal S is amplified by a logarithmic amplifier 20 and is then digitized into a digital image signal D with a predetermined scale factor in an analog-to-digital converter 21. The digital image signal D, which has thus been obtained and represents the two-dimensional image, is fed into an image processing apparatus 27. In the image processing apparatus 27, the digital image signal D is subjected to an interpolating operation process for image size enlargement with a predetermined image size enlargement scale factor. The image signal D, which has been obtained from the interpolating operation process, is then subjected to image processing, such as gradation processing or frequency emphasis processing. An image signal D' is thus obtained from the image processing apparatus 27. The image signal D' is then fed into a thermal recording apparatus 28, which is provided with a thermal head 28a. In the thermal recording apparatus 28, a two-dimensional visible image is reproduced as a hard copy 29 from the image signal D'.

How the interpolating operation process is carried out in the image processing apparatus 27 will be described hereinbelow.

The image processing apparatus 27 comprises a buffer memory 23 for temporarily storing the digital image signal, which represents the picture element values of picture elements of a single image, and a memory 24 for storing information representing the interpolation coefficients, which will be described later, or the like. The image processing apparatus 27 also comprises an interpolating operation means 25 and an image processing means 26.

Figure 2:
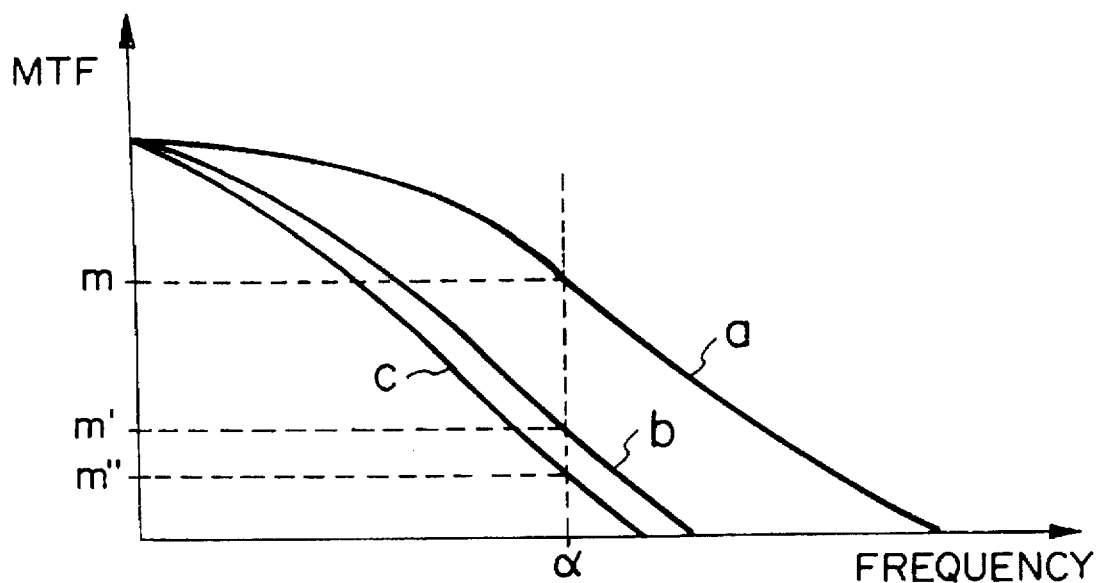
FIG. 2 is a graph showing response characteristics of an interpolation image with respect to image size enlargement scale factors.

FIG. 2 shows response characteristics of an interpolation image signal with respect to image size enlargement scale factors. In FIG. 2, a frequency α is taken as the frequency, for which the response is to be kept to be equal to a predetermined level regardless of enlargement scale factors a, b, and c. The modulation transfer functions (MTF; frequency dependence characteristics) of the interpolation image signals respectively obtained with the enlargement scale factors a, b, and c, which modulation transfer functions correspond to the frequency α, are represented respectively by m, m', and m". In such cases, in order for the responses at the frequency α to be kept to be equal to one another, it is necessary to carry out a one-dimensional interpolating operation on the image signal D by using a function such that the response with the enlargement scale factor b may become equal to m/m' with respect to the response with the enlargement scale factor a. Also, it is necessary to carry out a one-dimensional interpolating operation on the image signal D by using a function such that the response with the enlargement scale factor c may become equal to m/m" with respect to the response with the enlargement scale factor a. For such purposes, in the interpolating operation means 25, one of different interpolating operation processes is carried out on the image signal D such that the response of the obtained interpolation image may be kept to be approximately equal to a predetermined level with respect to each of the enlargement scale factors a, b, and c.

In this embodiment, how the interpolating operation for the enlargement scale factor b with respect to the enlargement scale factor a is carried out will be described hereinbelow. The interpolating operation for the enlargement scale factor c with respect to the enlargement scale factor a may be carried out in the same manner as that described below. As illustrated in FIG. 2, the response with the enlargement scale factor a is higher than the response with the enlargement scale factor b. Therefore, in cases where the enlargement scale factor a is employed, the B spline interpolating operation, which yields a smooth interpolation image having a low sharpness, is carried out on the image signal D. In cases where the enlargement scale factor b is employed, the cubic spline interpolating operation, which yields an interpolation image having a high sharpness, is carried out on the image signal D.

How the cubic spline interpolating operation and the B spline interpolating operation are carried out will hereinbelow be described in detail.

Figure 3:
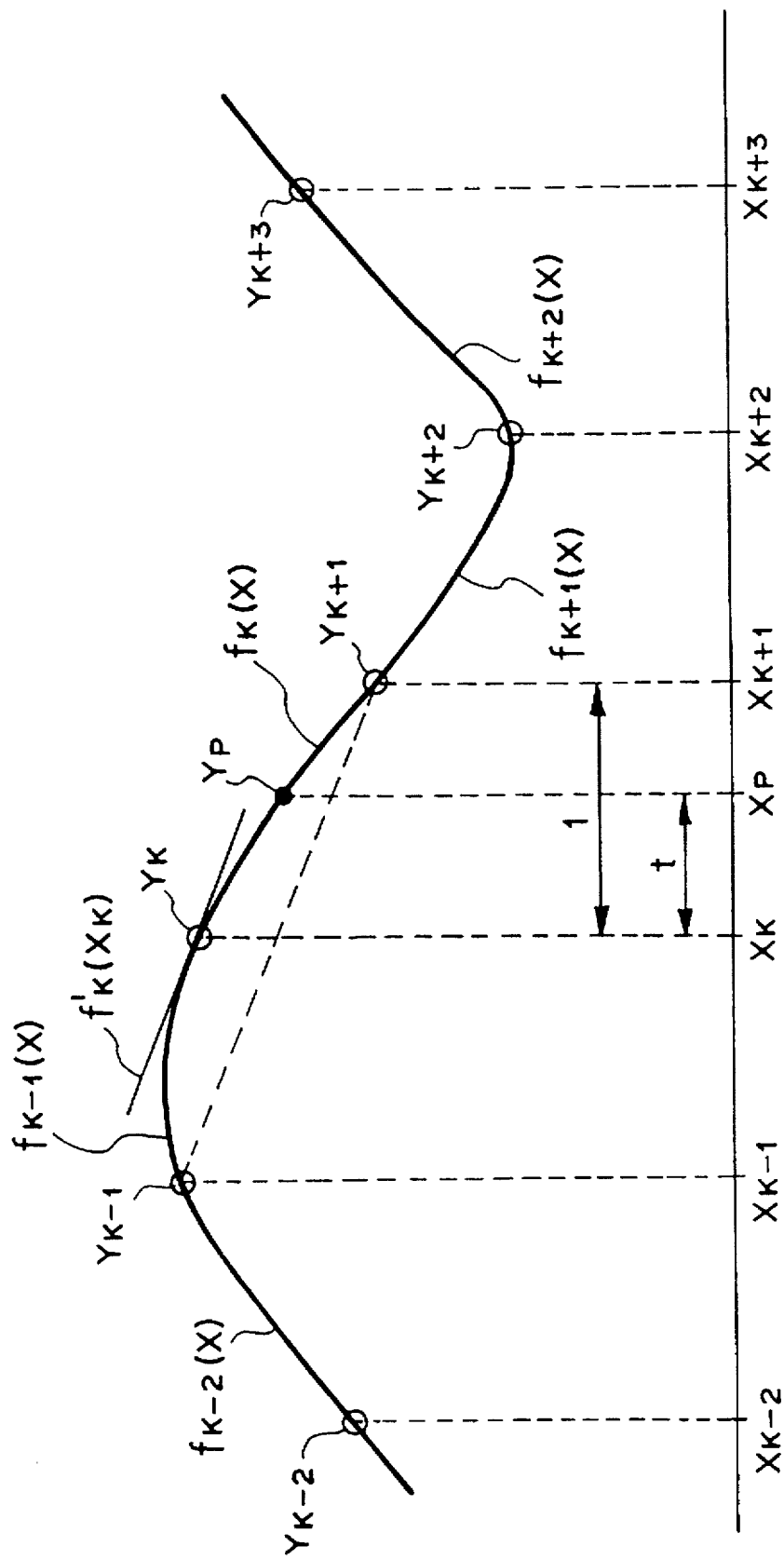
FIG. 3 is an explanatory graph showing how interpolated image signal components are obtained from original image signal components, which are sampled with a period of an equal interval and represent sampling points (picture elements) arrayed in one direction.

FIG. 3 is an explanatory graph showing how interpolated image signal components are obtained from original image signal components, which are sampled with a period of an equal interval and represent sampling points (picture elements) arrayed in one direction. As illustrated in FIG. 3, the image signal components (the original image signal components), which have been detected as digital signal components from an original image and represent a series of picture elements $X_{k-2}$, $X_{k-1}$, $X_k$, $X_{k+1}$, $X_{k+2}$, ..... are respectively represented by $Y_{k-2}$, $Y_{k-1}$, $Y_k$, $Y_{k+1}$, $Y_{k+2}$ ... A third-order spline interpolating function is set for each of sections $X_{k-2}$~$X_{k-1}$, $X_{k-1}$~$X_k$, $X_k$~$X_{k+1}$, and $X_{k+1}$~$X_{k+2}$. The spline interpolating functions corresponding to the respective sections are represented by $f_{k-2}$, $f_{k-1}$, $f_k$, $f_{k+1}$, and $f_{k+2}$. The interpolating functions are the third-order functions, in which the position in each section serves as a variable.

Firstly, how the interpolating operation is carried out when a point taken for interpolation (hereinbelow referred to as the interpolation point) $X_p$ falls within the Section $X_k$~$X_{k+1}$ will be described hereinbelow. The spline interpolating function $f_k$ corresponding to the section $X_k$~$X_{k+1}$ is represented by Formula (1).

$$f_k(x)=A_k x^3+B_k x^2+C_k x+D_k \tag{1}$$

In the cubic spline interpolating operation, it is necessary that the spline interpolating function $f_k$ passes through the original sampling points (picture elements), and that the first-order differential coefficient of the spline interpolating function $f_k$ is continuous between adjacent sections. Therefore, it is necessary for Formulas (2), (3), (4), and (5) to be satisfied.

$$f_k(X_k)=Y_k \tag{2}$$

$$f_k(X_{k+1})=Y_{k+1} \tag{3}$$

$$f_k'(X_k)=f_{k-1}'(X_k) \tag{4}$$

$$f_k'(X_{k+1})=f_{k+1}'(X_{k+1}) \tag{5}$$

In these formulas, $f_k'$ represents the first-order differentiation $(3A_k x^2+2B_k x+C_k)$ of the function $f_k$. In the strict sense, the cubic spline interpolating operation contains the continuity conditions of the second-order differential coefficient. However, with continuity conditions of the second-order differential coefficient, the operation formulas become complicated. Therefore, the cubic spline interpolating operation is popularly carried out in the form simplified in the manner described above.

Also, in the cubic spline interpolating operation, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$. Therefore, it is necessary for Formula (6) to be satisfied.

$$f_k'(X_k)=(Y_{k+1}-Y_{k-1})/(X_{k+1}-X_{k-1}) \tag{6}$$

Also, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2}-Y_k)/(X_{k+2}-X_k)$ of the image signal components $Y_k$ and $Y_{k+2}$ representing the picture elements $X_k$ and $X_{k+2}$. Therefore, it is necessary for Formula (7) to be satisfied.

$$f_k'(X_{k+1})=(Y_{k+2}-Y_k)/(X_{k+2}-X_k) \tag{7}$$

It is herein assumed that the interval (i.e., the lattice interval) of each of sections $X_{k-2}$~$X_{k-1}$, $X_{k-1}$~$X_k$, $X_k$~$X_{k+1}$, and $X_{k+1}$~$X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (1), (2), (3), (4), (5), (6), and (7), the formulas shown below obtain.

$$f_k(0)=D_k=Y_k$$

$$f_k(1)=A_k+B_k+C_k+D_k=Y_{k+1}$$

$$f_k'(0)=C_k=(Y_{k+1}-Y_{k-1})/2$$

$$f_k'(1)=3A_k+2B_k+C_k=(Y_{k+2}-Y_k)/2$$

Therefore, the formulas shown below obtain.

$$A_k=(Y_{k+2}-3Y_{k+1}+3Y_k-Y_{k-1})/2$$

$$B_k=(-Y_{k+2}+4Y_{k+1}-5Y_k+2Y_{k-1})/2$$

$$C_k=(Y_{k+1}-Y_{k-1})/2$$

$$D_k=Y_k$$

As described above, the variable conversion of X=t is carried out, and therefore the spline interpolating function $f_k(x)$ is represented by the formula shown below.

$$f_k(x)=f_k(t)$$

Therefore, an interpolated image signal component $Y_p$ corresponding to the interpolation point $X_p$ may be represented by Formula (8).

$$Y_p=f_k(t)=A_kt^3+B_kt^2+C_kt+D_k \tag{8}$$

Substituting the coefficients $A_k$, $B_k$, $C_k$, and $D_k$ into Formula (8) yields $$Y_p = \{(Y_{k+2}-3Y_{k+1}+3Y_k-Y_{k-1})/2\}t^3 +$$
$$\{(-Y_{k+2}+4Y_{k+1}-5Y_k+2Y_{k-1})/2\}t^2 +$$
$$\{(Y_{k+1}-Y_{k-1})/2\}t + Y_k$$

Arranging this formula with respect to the image signal components $Y_{k-1}$, $Y_k$, $Y_{k+1}$, and $Y_{k+2}$ yields Formula (9).

$$Y_p = \{(-t^3+2t^2-t)/2\}Y_{k-1} + \tag{9}$$
$$\{(3t^3-5t^2+2)/2\}Y_k +$$
$$\{(-3t^3+4t^2+t)/2\}Y_{k+1} +$$
$$\{(t^3-t^2)/2\}Y_{k+2}$$

The coefficients for the image signal components $Y_{k-1}$, $Y_k$, $Y_{k+1}$, and $Y_{k+2}$ are referred to as the interpolation coefficients $a_{k-1}$, $a_k$, $a_{k+1}$, and $a_{k+2}$. Specifically, the interpolation coefficients $a_{k-1}$, $a_k$, $a_{k+1}$, and $a_{k+2}$, which respectively correspond to the image signal components $Y_{k-1}$, $Y_k$, $Y_{k+1}$, and $Y_{k+2}$ in Formula (9), may be represented by the formulas shown below.

$$a_{k-1}=(-t^3+2t^2-t)/2$$

$$a_k=(3t^3-5t^2+2)/2$$

$$a_{k+1}=(-3t^3+4t^2+t)/2$$

$$a_{k+2}=(t^3-t^2)/2$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

As described above, in the cubic spline interpolating operation, it is necessary that the spline interpolating function passes through the original sampling points (picture elements), and that the first-order differential coefficient of the spline interpolating function is continuous between adjacent sections. With the cubic spline interpolating operation, the interpolation image signal for use in the reproduction of a secondary image (i.e., the image obtained from the interpolating operation), which has a comparatively high sharpness, is obtained. On the other hand, as the interpolating operation for obtaining an interpolation image signal representing a secondary image, in which the sharpness is comparatively low and which is smooth, the B spline interpolating operation is known. In the B spline interpolating operation, the spline interpolating function need not pass through the original sampling points (picture elements), and it is necessary that the first-order differential coefficient and the second-order differential coefficient {represented by f"(X)} of the spline interpolating function are continuous between adjacent sections.

Specifically, in Formula (1), $$f_k(x)=A_kx^3+B_kx^2+c_kx+D_k \tag{1}$$

the conditions shown below should be satisfied.

$$f_k'(X_k)=f_{k-1}'(X_k) \tag{10}$$

$$f_k'(X_{k+1})=f_{k+1}'(X_{k+1}) \tag{11}$$

$$f_k''(X_k)=f_{k-1}''(X_k) \tag{12}$$

$$f_k''(X_{k+1})=f_{k+1}''(X_{k+1}) \tag{13}$$

Also, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$. Therefore, it is necessary for Formula (14) to be satisfied.

$$f_k'(X_k)=(Y_{k+1}-Y_{k-1})/(X_{k+1}-X_{k-1}) \tag{14}$$

Further, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2}-Y_k)/(X_{k+2}-X_k)$ of the image signal components $Y_k$ and $Y_{k+2}$ representing the picture elements $X_k$ and $X_{k+2}$. Therefore, it is necessary for Formula (15) to be satisfied.

$$f_k'(X_{k+1})=(Y_{k+2}-Y_k)/(X_{k+2}-X_k) \tag{15}$$

In general, the function f (X) may be approximately represented by Formula (16).

$$f(X)=f(0)+f'(0)X+\{f''(0)/2\}X^2 \tag{16}$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (1), (10), (11), (12), (13), (14), (15) and (16), the formulas shown below obtain.

$$f_k'(0)=C_k=(Y_{k+1}-Y_{k-1})/2$$

$$f_k'(1)=3A_k+2B_k+C_k=(Y_{k+2}-Y_k)/2$$

$$f_k''(0)=Y_{k+1}-2Y_k+Y_{k-1}=2B$$

Therefore, the formulas shown below obtain.

$$A_k=(Y_{k+2}-3Y_{k+1}+3Y_k-Y_{k-1})/6$$

$$B_k=(Y_{k+1}-2Y_k+Y_{k-1})/2$$

$$C_k = (Y_{k+1} - Y_{k-1})/2$$

Since $D_k$ is unknown, it is represented by the formula $$D_k = (D_1 Y_{k+2} + D_2 Y_{k+1} + D_3 Y_k + D_4 Y_{k-1})/6$$

As described above, the variable conversion of X=t is carried out, and therefore the spline interpolating function $f_k(x)$ is represented by the formula shown below.

$$f_k(x) = f_k(t)$$

Therefore, $$f_k(t) = \{(Y_{k+2} - 3Y_{k-1} Y_{k-1})/6\} t^3 +$$
$$\{(Y_{k+1} - 2Y_k + Y_{k-1})/2\} t^2 +$$
$$\{(Y_{k+1} - Y_{k-1})/2\} t +$$
$$(D_1 Y_{k+2} + D_2 Y_{k+1} + D_3 Y_k + D_4 Y_{k-1})/6$$

Arranging this formula with respect to the image signal components $Y_{k-1}$, $Y_k$, $Y_{k+1}$, and $Y_{k+2}$ yields Formula (17).

$$f_k(t) = \{(-t^3 + 3t^2 - 3t + D_4)/6\} Y_{k-1} + \qquad (17)$$
$$\{(3t^3 - 6t^2 + D_3)/6\} Y_k +$$
$$\{(-3t^3 + 3t^2 + 3t + D_2)/6\} Y_{k+1} +$$
$$\{(t^3 + D_1)/6\} Y_{k+2}$$

If t is set to be t=1, the formula shown below will obtain.

$$f_k(1) = \{(D_4-1)/6\} Y_{k-1} + \{(D_3-3)/6\} Y_k + \{(D_2+3)/6\} Y_{k+1} + \{(D_1+1)/6\} Y_{k+2}$$

As for the section $X_{k+1} \sim X_{k+2}$, Formula (17) may be rewritten as Formula (18)

$$f_{k+1}(t) = \{(-t^3 + 3t^2 - 3t + D_4)/6\} Y_k + \qquad (18)$$
$$\{(3t^3 - 6t^2 + D_3)/6\} Y_{k+1} +$$
$$\{(-3t^3 + 3t^2 + 3t + D_2)/6\} Y_{k+2} +$$
$$\{(t^3 + D_1)/6\} Y_{k+3}$$

If t is set to be t=0, the formula shown below will obtain.

$$f_{k+1}(0) = (D_4/6) Y_k + (D_3/6) Y_{k+1} + (D_2/6) Y_{k+2} + (D_1/6) Y_{k+3}$$

From the continuity condition $\{f_k(1) = f_{k+1}(0)\}$ and the condition in that the coefficients corresponding to the respective original image signal components are equal to each other, $D_4 - 1 = 0$, $D_3 - 3 = D_4$, $D_2 + 3 = D_3$, $D_1 + 1 = D_2$, and $D_1 = 0$. Therefore, $$D_k = (Y_{k+1} + 4Y_k + Y_{k-1})/6$$

Accordingly, Formula (19) obtains.

$$Y_p = f_k(t) = \{(-t^3 + 3t^2 - 3t + 1)/6\} Y_{k-1} + \qquad (19)$$
$$\{(3t^3 - 6t^2 + 4)/6\} Y_k +$$
$$\{(-3t^3 + 3t^2 + 3t + 1)/6\} Y_{k+1} +$$
$$(t^3/6) Y_{k+2}$$

Therefore, the interpolation coefficients $b_{k-1}$, $b_k$, $b_{k+1}$, and $b_{k+2}$, which respectively correspond to the image signal components $Y_{k-1}$, $Y_k$, $Y_{k+1}$, and $Y_{k+2}$, may be represented by the formulas shown below.

$$b_{k-1} = (-t^3 + 3t^2 - 3t + 1)/6$$

$$b_k = (3t^3 - 6t^2 + 4)/6$$

$$b_{k+1} = (-3t^3 + 3t^2 + 3t + 1)/6$$

$$b_{k+2} = t^3/6$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

The information representing the interpolation coefficients $a_{k-1}$, $a_k$, $a_{k+1}$, and $a_{k+2}$ and the interpolation coefficients $b_{k-1}$, $b_k$, $b_{k+1}$, and $b_{k+2}$, which have been calculated in the manner described above, is stored in the memory 24. When the image signal D is fed into the interpolating operation means 25, the interpolating operation means 25 reads the information representing the interpolation coefficients from the memory 24 and carries out the interpolating operation on the image signal D and in accordance with the interpolation coefficients. Specifically, in cases where the enlargement scale factor a is employed, the B spline interpolating operation, which yields a smooth interpolation image having a low sharpness, is carried out on the image signal D. In cases where the enlargement scale factor b is employed, the cubic spline interpolating operation, which yields an interpolation image having a high sharpness, is carried out on the image signal D.

The interpolating operation process is carried out in the manner described above. The image signal, which represents an interpolation image having been enlarged with the pre-determined image size enlargement scale factor, is obtained from the interpolating operation process. The thus obtained image signal is fed into the image processing means 26 and subjected to image processing, such as frequency processing. The image signal D' having thus been obtained from the image processing is fed into the thermal recording apparatus 28 and used for the reproduction of the visible image as the hard copy 29.

In the interpolation image having thus been reproduced, the difference in the response due to the image size enlargement scale factor has been compensated for, and the response of the reproduced image is kept to be approximately equal to a predetermined level regardless of the image size enlargement scale factor. In this manner, the problems can be prevented from occurring in that the response varies for different image size enlargement scale factors.

In the embodiment described above, the B spline interpolating operation is carried out with respect to the enlargement scale factor a, and the cubic spline interpolating operation is carried out with respect to the enlargement scale factor b. Alternatively, the interpolating operation process of the image signal D may be carried out by using both of the B spline interpolating operation and the cubic spline interpolating operation, and weighting the interpolation coefficients for the B spline interpolating operation and the interpolation coefficients for the cubic spline interpolating operation in accordance with the image size enlargement scale factor.

Specifically, Formula (20) shown below may be set.

$$F = \alpha \cdot A + (1-\alpha) \cdot B \qquad (20)$$

in which F represents the new interpolation coefficients, A and B represent the interpolation coefficients, and $\alpha$ represents the weight factor taking one of values including a range smaller than 0 and/or a range larger than 1. In Formula (20), the interpolation coefficients for the cubic spline interpolating operation are set as A, and the interpolation Coefficients for the B spline interpolating operation are set as B. The value of the weight factor $\alpha$ is altered such that the response of the interpolation image may become approximately equal to a predetermined level, and the interpolating operation process is thereby carried out. For example, the interpolation coefficients for the cubic spline interpolating operation, which correspond to the original image signal components $Y_{k-1}$, $Y_k$, $Y_{k+1}$, and $Y_{k+2}$, may be represented respectively by $a_{k-1}$, $a_k$, $a_{k+1}$, and $a_{k+2}$. Also, the interpolation coefficients for the B spline interpolating operation, which correspond to the original image signal components $Y_{k-1}$, $Y_k$, $Y_{k+1}$, and $Y_{k+2}$, may be represented respectively by $b_{k-1}$, $b_k$, $b_{k+1}$, and $b_{k+2}$. In such cases, the interpolated value S' is represented by Formula (21).

$$S' = \{\alpha \cdot a_{k-1} + (1-\alpha) \cdot b_{k-1}\}Y_{k-1} + \quad (21)$$
$$\{\alpha \cdot a_k + (1-\alpha) \cdot b_k\}Y_k +$$
$$\{\alpha \cdot a_{k+1} + (1-\alpha) \cdot b_{k+1}\}Y_{k+1} +$$
$$\{\alpha \cdot a_{k+2} + (1-\alpha) \cdot b_{k+2}\}Y_{k+2}$$

Also, in cases where the enlargement scale factor a is employed, the interpolating operation is carried out by setting the value of the weight factor $\alpha$ to be small such that the interpolation coefficients for the B spline interpolating operation may be weighted heavily. In cases where the enlargement scale factor b is employed, the interpolating operation is carried out by setting the value of the weight factor $\alpha$ to be large such that the interpolation coefficients for the cubic spline interpolating operation may be weighted heavily. In this manner, the interpolating operation process may be carried out by weighting the interpolation coefficients for the B spline interpolating operation and the interpolation coefficients for the cubic spline interpolating operation. As a result, the response of the reproduced interpolation image can be kept to be approximately equal to a predetermined level regardless of the image size enlargement scale factor.

Further, when the interpolating operation process is carried out on the original image signal and in accordance with the image size enlargement scale factor, frequency processing, such as unsharp mask processing described in, for example, Japanese Unexamined Patent Publication No. 55(1980)-163472, may be carried out. The response of the interpolation image in accordance with the image size enlargement scale factor may thereby be adjusted.

Specifically, the filtering process corresponding to the operation processing, which is represented by the formula D'=Dorg+β(Dorg−Dus) is carried out on the original image signal Dorg in accordance with the image size enlargement scale factor. In this formula, β represents the emphasis coefficient, and Dus represents the unsharp mask signal corresponding to super-low frequency with respect to each picture element in the image. If the mask size is equal to N, and the total sum of the picture element values of the picture elements, which are located in the region of the mask size, is represented by Σ, the formula of Dus=Σ/N obtains.

For example, in cases where N=3, and the original image signal components representing the three picture elements, which are arrayed along the X direction, are represented by $x_1$, $x_2$, and $x_3$, the formula shown below obtains with respect to the original image signal component $x_2$ representing the middle picture element.

$$D' = x_2 + \beta\{x_2 - (x_1 + x_2 + x_3)/3\}$$
$$= (-\beta/3)x_1 + (1 + 2\beta/3)x_2 + (-\beta/3)x_3$$

Therefore, the filtering process is carried out such that the original image signal component $x_2$ may be replaced by $x_2'$, which is represented by Formula (22).

$$x_2' = ax_1 + bx_2 + cx_3 \quad (22)$$

wherein
b=1+2β/3 and
a=c=−β/3

In the manner described above, when the interpolating operation process is carried out on the original image signal and in accordance with the image size enlargement scale factor, the frequency processing may be carried out such that the response of the interpolation image may become approximately equal to a predetermined level regardless of the image size enlargement scale factor. In such cases, as in the embodiment described above, the difference in the response of the interpolation image due to the image size enlargement scale factor can be compensated for, and the response of the reproduced image can be kept to be approximately equal to a predetermined level regardless of the image size enlargement scale factor. In this manner, the problems can be prevented from occurring in that the response varies for different image size enlargement scale factors.

Furthermore, in the aforesaid embodiment, in lieu of Formulas (6) and (7), Formulas (6') and (7') shown below, in which a parameter $\alpha$ is utilized, may be employed.

$$f_k'(X_k) = \alpha(Y_{k+1} - Y_{k-1})/(X_{k+1} - X_{k-1}) \quad (6')$$

$$f_k'(X_{k+1}) = \alpha(Y_{k+2} - Y_k)/(X_{k+2} - X_k) \quad (7')$$

The value of the parameter $\alpha$ may be altered, and the interpolating operation process may thereby be carried out.

Specifically, with the conventional cubic spline interpolating operation, the parameter $\alpha$ in Formulas (6') and (7') is fixed to be equal to 1. Therefore, in cases where the conventional cubic spline interpolating operation is carried alone, or in cases where the conventional B spline interpolating operation is carried out alone, only the secondary image having a single level of response can be obtained. Also, with the spline interpolating operation, in which the cubic spline interpolating operation and the B spline interpolating operation are combined with each other and which is disclosed in U.S. Pat. No. 5,048,105, the adjustment of the response can be carried out only within the range of the response, which is obtained with the cubic spline interpolating operation, to the response, which is obtained with the B spline interpolating operation. However, in cases where the value of the parameter $\alpha$ can be altered and is set to be, for example, larger than 1, an interpolation image having a response higher than the response of the interpolation image, which is obtained from the conventional cubic spline interpolating operation, can be obtained. As the parameter $\alpha$ is set to be a larger value, a higher response can be obtained. Also, by the setting of the parameter $\alpha$ to be smaller than 1, an interpolation image having a response lower than the response of the interpolation image, which is obtained from the conventional B spline interpolating operation, can be obtained. As the parameter $\alpha$ is set to be a smaller value, a lower response can be obtained. Therefore, the value of the parameter $\alpha$ may be altered arbitrarily, and an interpolation image signal having a desired level of response can thereby be obtained.

In the manner described above, when the interpolating operation process is carried out on the original image signal and in accordance with the image size enlargement scale factor, the parameter $\alpha$ for the adjustment of the response may be set. In such cases, as in the embodiment described above, the difference in the response of the interpolation image due to the image size enlargement scale factor can be compensated for, and the response of the reproduced image can be kept to be approximately equal to a predetermined level regardless of the image size enlargement scale factor. In this manner, the problems can be prevented from occurring in that the response varies for different image size enlargement scale factors.

An embodiment of the apparatus for carrying out the second interpolating operation method for an image signal in accordance with the present invention will be described hereinbelow. By way of example, this embodiment is incorporated in the same radiation image read-out and reproducing system as that shown in FIG. 1. Basically, this embodiment has the same constitution as that of the image processing apparatus 27 shown in FIG. 1.

How the interpolating operation processes are carried out in this embodiment of the image processing apparatus 27 will be described hereinbelow.

In this embodiment, the image processing apparatus 27 comprises a buffer memory 23 for temporarily storing the digital image signal, which represents the picture element values of picture elements of a single image, and a memory 24 for storing information representing the interpolation coefficients, which will be described later, or the like. The image processing apparatus 27 also comprises an interpolating operation means 25 and an image processing means 26.

Figure 4:
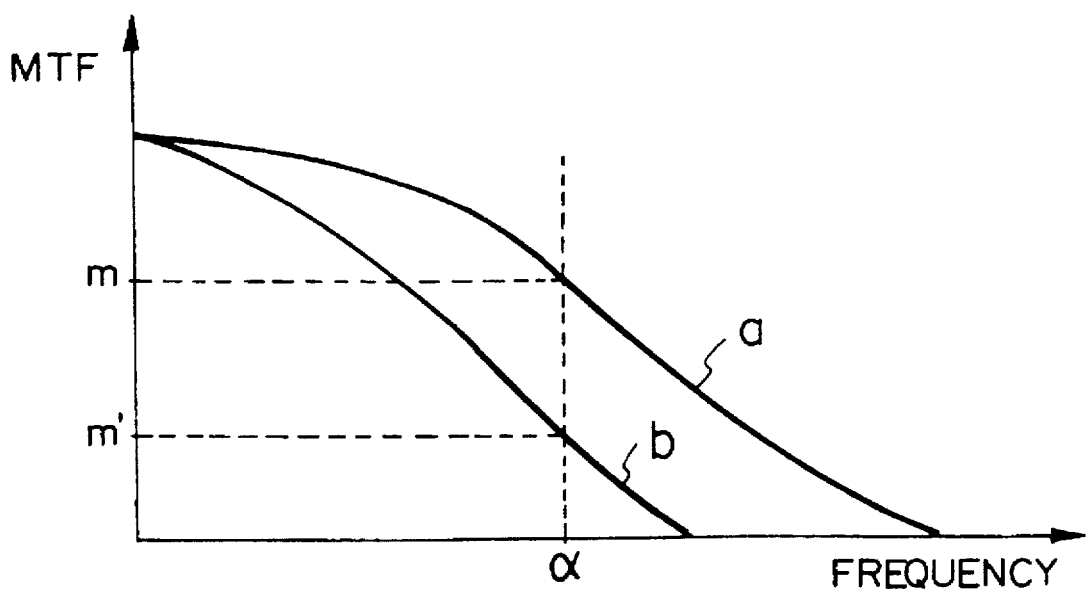
FIG. 4 is a graph showing response characteristics of an image reproducing apparatus along X and Y directions.

FIG. 4 shows response characteristics a of the thermal recording apparatus 28 along the X direction (i.e., the main scanning direction) and response characteristics b of the thermal recording apparatus 28 along the Y direction (i.e., the sub-scanning direction). In FIG. 4, a frequency $\alpha$ is taken as the frequency, for which the responses along the X and Y directions are to be primarily kept to be equal to each other. The MTF's along the X and Y directions, which MTF's correspond to the frequency $\alpha$, are represented respectively by m and m'. In such cases, in order for the responses along the X and Y directions to be kept to be equal to each other, it is necessary to carry out a one-dimensional interpolating operation with respect to each of the X and Y directions by using a function such that the response along the Y direction may become equal to m/m' with respect to the response along the X direction. For such purposes, in the interpolating operation means 25, different interpolating operation processes are carried out on the image signal D such that the response of the interpolation image signal may become different between the X and Y directions.

In this embodiment, as illustrated in FIG. 4, the response of the thermal recording apparatus 28 along the X direction is higher than the response of the thermal recording apparatus 28 along the Y direction. Therefore, the B spline interpolating operation, which yields a smooth interpolation image having a low sharpness, is carried out on the image signal D along the X direction. Also, the cubic spline interpolating operation, which yields an interpolation image having a high sharpness, is carried out on the image signal D along the Y direction.

The information representing the interpolation coefficients $a_{k-1}$, $a_k$, $a_{k+1}$, and $a_{k+2}$ for the cubic spline interpolating operation and the interpolation coefficients $b_{k-1}$, $b_k$, $b_{k+1}$, and $b_{k+2}$ for the B spline interpolating operation, which have been calculated in the same manner as that described above, is stored in the memory 24. When the image signal D is fed into the interpolating operation means 25, the interpolating operation means 25 reads the information representing the interpolation coefficients from the memory 24 and carries out the interpolating operation on the image signal D and in accordance with the interpolation coefficients. Specifically, the B spline interpolating operation, which yields a Smooth interpolation image having a low sharpness, is carried out on the image signal D along the X direction. Also, the cubic spline interpolating operation, which yields an interpolation image having a high sharpness, is carried out on the image signal D along the Y direction.

The interpolating operation processes are carried out in the manner described above. The image signal, which represents an interpolation image having been enlarged with a predetermined image size enlargement scale factor, is obtained from the interpolating operation processes. The thus obtained image signal is fed into the image processing means 26 and subjected to image processing, such as frequency processing. The image signal D' having thus been obtained from the image processing is fed into the thermal recording apparatus 28 and used for the reproduction of the visible image as the hard copy 29.

In the radiation image having thus been reproduced, the difference between the responses of the thermal recording apparatus 28 along the X and Y directions has been compensated for, and the ultimate responses of the reproduced image along the X and Y directions are kept to be approximately equal to each other. In this manner, the balance of the responses of the reproduced image along the X and Y directions can be prevented from varying. Also, the problems can be prevented from occurring in that the frequency emphasis processing becomes excessive with respect to one of the X and Y directions, and in that an artifact is thereby caused to occur in the reproduced image.

In this embodiment, the B spline interpolating operation is carried out with respect to the X direction of the original image signal, and the cubic spline interpolating operation is carried out with respect to the Y direction of the original image signal. Alternatively, for each of the X and Y directions, the interpolating operation process may be carried out by using both of the B spline interpolating operation and the cubic spline interpolating operation, and weighting the interpolation coefficients for the B spline interpolating operation and the interpolation coefficients for the cubic spline interpolating operation. Specifically, Formula (20) shown below may be set.

$$F = \alpha \cdot A + (1-\alpha) \cdot B \qquad (20)$$

in which F represents the new interpolation coefficients, A and B represent the interpolation coefficients, and $\alpha$ represents the weight factor taking one of values including a range smaller than 0 and/or a range larger than 1. In Formula (20), the interpolation coefficients for the cubic spline interpolating operation are set as A, and the interpolation coefficients for the B spline interpolating operation are set as B. The value of the weight factor $\alpha$ is altered such that the ultimate responses of the original image signal along the X and Y directions may become approximately equal to each other, and the interpolating operation processes are thereby carried out. For example, the interpolation coefficients for the cubic spline interpolating operation, which correspond to the original image signal components $Y_{k-1}$, $Y_k$, $Y_{k+1}$, and $Y_{k+2}$, may be represented respectively by $a_{k-1}$, $a_k$, $a_{k+1}$, and $a_{k+2}$. Also, the interpolation coefficients for the B spline interpolating operation, which correspond to the original image signal components $Y_{k-1}$, $Y_k$, $Y_{k+1}$, and $Y_{k+2}$, may be represented respectively by $b_{k-1}$, $b_k$, $b_{k+1}$, and $b_{k+2}$. In such cases, the interpolated value S' is represented by Formula (21).

$$S' = \{\alpha \cdot a_{k-1} + (1-\alpha) \cdot b_{k-1}\}Y_{k-1} + \quad (21)$$
$$\{\alpha \cdot a_k + (1-\alpha) \cdot b_k\}Y_k +$$
$$\{\alpha \cdot a_{k+1} + (1-\alpha) \cdot b_{k+1}\}Y_{k+1} +$$
$$\{\alpha \cdot a_{k+2} + (1-\alpha) \cdot b_{k+2}\}Y_{k+2}$$

In this manner, the interpolating operation processes may be carried out by weighting the interpolation coefficients along the X direction and the interpolation coefficients along the Y direction. As a result, the responses of the reproduced image can be adjusted finely such that the responses along the X and Y directions may become equal to each other.

Further, when the interpolating operation processes are carried out on the original image signal along the X and Y directions, frequency processing, such as unsharp mask processing described in, for example, Japanese Unexamined Patent Publication No. 55(1980)-163472, may be carried out. The responses along the X and Y directions may thereby be adjusted.

Specifically, for each of scanning lines extending along each of the X and Y directions, the filtering process corresponding to the operation processing, which is represented by the formula $$D' = Dorg + \beta(Dorg - Dus)$$

is carried out on the image signal component of the original image signal Dorg, which corresponds to each of the picture elements constituting the scanning line. In this formula, β represents the emphasis coefficient, and Dus represents the unsharp mask signal corresponding to super-low frequency with respect to each picture element in the image. If the mask size is equal to N, and the total sum of the picture element values of the picture elements, which are located in the region of the mask size, is represented by Σ, the formula of Dus=Σ/N obtains.

For example, in cases where N=3, and the original image signal components representing the three picture elements, which are arrayed along the X direction, are represented by $x_1$, $x_2$, and $x_3$, the formula shown below obtains with respect to the original image signal component $x_2$ representing the middle picture element.

$$D' = x_2 + \beta\{x_2 - (x_1 + x_2 + x_3)/3\}$$
$$= (-\beta/3)x_1 + (1 + 2\beta/3)x_2 + (-\beta/3)x_3$$

Therefore, the filtering process is carried out such that the original image signal component $x_2$ may be replaced by $x_2'$, which is represented by Formula (22).

$$x_2' = ax_1 + bx_2 + cx_3 \quad (22)$$

wherein
b=1+2β/3 and
a=c=−β/3

In the manner described above, when the interpolating operation process is carried out with respect to each of the X and Y directions of the original image signal, the frequency processing for adjusting the responses along the X and Y directions may be carried out. In such cases, as in the embodiment described above, the difference between the responses Of the thermal recording apparatus 28 along the X and Y directions can be compensated for, and the ultimate responses of the reproduced image along the X and Y directions can be kept to be approximately equal to each other. In this manner, the balance of the responses of the reproduced image along the X and Y directions can be prevented from varying. Also, the problems can be prevented from occurring in that the frequency emphasis processing becomes excessive with respect to one of the X and Y directions, and in that an artifact is thereby caused to occur in the reproduced image.

Furthermore, in the aforesaid embodiment, wherein the responses along the X and Y directions are adjusted, in lieu of Formulas (6) and (7), Formulas (6') and (7') shown below, in which a parameter α is utilized, may be employed.

$$f_k'(X_k) = \alpha(Y_{k+1} - Y_{k-1})/(X_{k+1} - X_{k-1}) \quad (6')$$

$$f_k'(X_{k+1}) = \alpha(Y_{k+2} - Y_k)/(X_{k+2} - X_k) \quad (7')$$

The value of the parameter α may be altered, and the interpolating operation processes may thereby be carried out.

Specifically, with the conventional cubic spline interpolating operation, the parameter α in Formulas (6') and (7') is fixed to be equal to 1. Therefore, in cases where the conventional cubic spline interpolating operation is carried alone, or in cases where the conventional B spline interpolating operation is carried out alone, only the secondary image having a single level of sharpness can be obtained. Also, with the spline interpolating operation, in which the cubic spline interpolating operation and the B spline interpolating operation are combined with each other and which is disclosed in U.S. Pat. No. 5,048,105, the adjustment of the sharpness can be carried out only within the range of the sharpness, which is obtained with the cubic spline interpolating operation, to the sharpness, which is obtained with the B spline interpolating operation. However, in cases where the value of the parameter α can be altered and is set to be, for example, larger than 1, an interpolation image having a sharpness higher than the sharpness of the interpolation image, which is obtained from the conventional cubic spline interpolating operation, can be obtained. As the parameter α is set to be a larger value, a higher sharpness can be obtained. Also, by the setting of the parameter α to be smaller than 1, an interpolation image having a sharpness lower than the sharpness of the interpolation image, which is obtained from the conventional B spline interpolating operation, can be obtained. As the parameter α is set to be a smaller value, a lower sharpness can be obtained. Therefore, the value of the parameter α may be altered arbitrarily, and an interpolation image signal having a desired level of sharpness can thereby be obtained.

In the manner described above, when the interpolating operation process is carried out on the original image signal with respect to each of the X and Y directions, the parameter α for the adjustment of the response along each of the X and Y directions may be set. In such cases, as in the embodiment described above, the difference between the responses of the thermal recording apparatus 28 along the X and Y directions can be compensated for, and the ultimate responses of the reproduced image along the X and Y directions can be kept to be approximately equal to each other. In this manner, the balance of the responses of the reproduced image along the X and Y directions can be prevented from varying. Also, the problems can be prevented from occurring in that the frequency emphasis processing becomes excessive with respect to one of the X and Y directions, and in that an artifact is thereby caused to occur in the reproduced image.

What is claimed is:

1. An interpolating operation method for an image signal, comprising the steps of:
   i) obtaining an original image signal, which represents an original image and is made up of a series of original image signal components representing picture element values of picture elements arrayed at predetermined intervals and in a lattice-like form,
   ii) carrying out an interpolating operation process on the original image signal components and in accordance with an image size enlargement scale factor with respect to the original image, which is represented by the original image signal, an interpolation image signal being obtained from the interpolating operation process, the interpolation image signal being made up of a series of image signal components, which occur at intervals different from those of the original image signal components, and
   iii) feeding the interpolation image signal into an image reproducing apparatus,
   wherein different types of interpolating operation processes are carried out on the original image signal in accordance with respective different image size enlargement scale factors, such that the response of an interpolation image, which is reproduced from the interpolation image signal and displayed on the image reproducing apparatus, is thereby kept to be approximately equal to a predetermined level regardless of the image size enlargement scale factor.

2. A method as defined in claim 1 wherein said different types of interpolating operation processes include interpolating operations selected from the group consisting of: B spline interpolating operations, cubic spline interpolating operations, and combinations of the B spline interpolating operations and the cubic spline interpolating operations.

3. A method as defined in claim 1 wherein, when one of said different types of interpolating operation processes is carried out on the original image signal in accordance with the image size enlargement scale factor, frequency processing is carried out such that the response of the interpolation image becomes approximately equal to the predetermined level regardless of the image size enlargement scale factor.

4. A method as defined in claim 1 wherein the original image is a radiation image.

5. A method as defined in claim 4 wherein the radiation image has been stored on a stimulable phosphor sheet.

6. A method as defined in claim 5 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

7. A method as defined in claim 1 wherein the original image has been recorded on photographic film.

8. A method as defined in claim 1, wherein a B spline interpolating operation process is carried out on the original image signal in accordance with a first image size enlargement scale factor having a first response, and a cubic spline interpolating operation process is carried out on the original image signal in accordance with a second image size enlargement scale factor having a second response which is less than the first response.

9. A method as defined in claim 1, wherein a first type of interpolating operation process is carried out on the original image signal in accordance with a first image size enlargement scale factor having a first response, and a second type of interpolating operation process is carried out on the original image signal in accordance with a second image size enlargement scale factor having a second response which is less than the first response, the first type of interpolating operation process employing a weighted combination of a B spline interpolating operation and a cubic spline interpolating operation, the second type of interpolating operation process employing a weighted combination of a B spline interpolating operation and a cubic spline interpolating operation, wherein the cubic spline interpolating operation is weighted more heavily in the second type of interpolating operation process than in the first type of interpolating operation process.

10. An interpolating operation apparatus for an image signal, comprising:
    i) means for receiving an original image signal, which represents an original image and is made up of a series of original image signal components representing picture element values of picture elements arrayed at predetermined intervals and in a lattice-like form,
    ii) interpolating operation processing means for carrying out an interpolating operation process on the original image signal and in accordance with an image size enlargement scale factor with respect to the original image, which is represented by the original image signal, an interpolation image signal being obtained from the interpolating operation process, the interpolation image signal being made up of a series of image signal components, which occur at intervals different from those of the original image signal components, and
    iii) means for feeding the interpolation image signal into an image reproducing apparatus,
    wherein the interpolating operation processing means carries out different types of interpolating operation processes on the original image signal in accordance with respective different image size enlargement scale factors, thereby to keep the response of an interpolation image, which is reproduced from the interpolation image signal and displayed on the image reproducing apparatus, to be approximately equal to a predetermined level regardless of the image size enlargement scale factor.

11. An apparatus as defined in claim 10 wherein said different types of interpolating operation processes include interpolating operations selected from the group consisting of: spline interpolating operations, cubic spline interpolating operations, and combinations of the B spline interpolating operations and the cubic spline interpolating operations.

12. An apparatus as defined in claim 10 wherein, when one of said different types of interpolating operation processes is carried out on the original image signal in accordance with the image size enlargement scale factor, frequency processing is carried out such that the response of the interpolation image becomes approximately equal to the predetermined level regardless of the image size enlargement scale factor.

13. An apparatus as defined in claim 10 wherein the original image is a radiation image.

14. An apparatus as defined in claim 13 wherein the radiation image has been stored on a stimulable phosphor sheet.

15. An apparatus as defined in claim 14 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

16. An apparatus as defined in claim 10 wherein the original image has been recorded on photographic film.

17. An apparatus as defined in claim 10, wherein the interpolating operation processing means carries out a B spline interpolating operation process on the original image signal in accordance with a first image size enlargement scale factor having a first response, and carries out a cubic spline interpolating operation process on the original image signal in accordance with a second image size enlargement scale factor having a second response which is less than the first response.

18. An apparatus as defined in claim 10, wherein the interpolating operation processing means carries out a first type of interpolating operation process on the original image signal in accordance with a first image size enlargement scale factor having a first response, and carries out a second type of interpolating operation process on the original image signal in accordance with a second image size enlargement scale factor having a second response which is less than the first response, the first type of interpolating operation process employing a weighted combination of a B spline interpolating operation and a cubic spline interpolating operation, the second type of interpolating operation process employing a weighted combination of a B spline interpolating operation and a cubic spline interpolating operation, wherein the cubic spline interpolating operation is weighted more heavily in the second type of interpolating operation process than in the first type of interpolating operation process.

19. An interpolating operation method for an image signal, comprising the steps of:
  i) obtaining an original image signal, which represents an original image and is made up of a series of original image signal components representing picture element values of picture elements arrayed at predetermined intervals and along X and Y directions in a lattice-like form,
  ii) carrying out interpolating operation processes on the original image signal, an interpolation image signal being obtained from the interpolating operation processes, the interpolation image signal being made up of a series of image signal components, which occur at intervals different from those of the original image signal components, and
  iii) feeding the interpolation image signal into an image reproducing apparatus, which reproduces an image by an operation for scanning along the X and Y directions,
  wherein a first type of interpolating operation process is carried out in the X direction and a second type of interpolating operation process, different from said first type of interpolating operation process, is carried out in the Y direction in accordance with a difference between responses of the image reproducing apparatus along the X and Y directions, such that the ultimate responses of an interpolation image, which is reproduced from the interpolation image signal and displayed on the image reproducing apparatus, along the X and Y directions are thereby kept approximately equal to each other.

20. A method as defined in claim 19, wherein said first and second types of interpolating operation processes include interpolating operations selected from the group consisting of: B spline interpolating operations, cubic spline interpolating operations, and combinations of the B spline interpolating operations and the cubic spline interpolating operations.

21. A method as defined in claim 19, wherein, when said first and second types of interpolating operation processes are carried out in the X and Y directions, respectively, frequency processing for adjusting the responses along the X and Y directions is carried out.

22. A method as defined in claim 19 wherein the original image is a radiation image.

23. A method as defined in claim 22 wherein the radiation image has been stored on a stimulable phosphor sheet.

24. A method as defined in claim 23 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

25. A method as defined in claim 19 wherein the original image has been recorded on photographic film.

26. A method as defined in claim 19, wherein: the response along the X direction is greater than the response along the Y direction; said first type of interpolating operation process is a B spline interpolating operation process; and said second type of interpolating operation process is a cubic spline interpolating operation process.

27. A method as defined in claim 19, wherein: the response along the X direction is greater than the response along the Y direction; said first type of interpolating operation process employs a weighted combination of a B spline interpolating operation and a cubic spline interpolating operation; and the second type of interpolating operation process employs a weighted combination of a B spline interpolating operation and a cubic spline interpolating operation, wherein the cubic spline interpolating operation is weighted more heavily in the second type of interpolating operation process than in the first type of interpolating operation process.

28. An interpolating operation apparatus for an image signal, comprising:
  i) means for obtaining an original image signal, which represents an original image and is made up of a series of original image signal components representing picture element values of picture elements arrayed at predetermined intervals and along X and Y directions in a lattice-like form,
  ii) means for carrying out interpolating operation processes on the original image signal, an interpolation image signal being obtained from the interpolating operation processes, the interpolation image signal being made up of a series of image signal components, which occur at intervals different from those of the original image signal components, and
  iii) means for feeding the interpolation image signal into an image reproducing apparatus, which reproduces an image by an operation for scanning along the X and Y directions,
  wherein the interpolating operation processing means carries out a first type of interpolating operation process in the X direction and a second type of interpolating operation process, different from said first type of interpolating operation process, in the Y direction in accordance with a difference between responses of the image reproducing apparatus along the X and Y directions, thereby to keep the ultimate responses of an interpolation image, which is reproduced from the interpolation image signal and displayed on the image reproducing apparatus, along the X and Y directions approximately equal to each other.

29. An apparatus as defined in claim 28 wherein said first and second types of interpolating operation processes include interpolating operations selected from the group consisting of: B spline interpolating operations, cubic spline interpolating operations, and combinations of the B spline interpolating operations and the cubic spline interpolating operations.

30. An apparatus as defined in claim 28, wherein, when said first and second types of interpolating operation processes are carried out in the X and Y directions, respectively, frequency processing for adjusting the responses along the X and Y directions is carried out.

31. An apparatus as defined in claim 28 wherein the original image is a radiation image.

32. An apparatus as defined in claim 31 wherein the radiation image has been stored on a stimulable phosphor sheet.

33. An apparatus as defined in claim 32 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

34. An apparatus as defined in claim 28 wherein the original image has been recorded on photographic film.

35. An apparatus as defined in claim 28, wherein: the response along the X direction is greater than the response along the Y direction; said first type of interpolating operation process is a B spline interpolating operation process; and said second type of interpolating operation process is a cubic spline interpolating operation process.

36. An apparatus as defined in claim 28, wherein: the response along the X direction is greater than the response along the Y direction; said first type of interpolating operation process employs a weighted combination of a B spline interpolating operation and a cubic spline interpolating operation; and the second type of interpolating operation process employs a weighted combination of a B spline interpolating operation and a cubic spline interpolating operation, wherein the cubic spline interpolating operation is weighted more heavily in the second type of interpolating operation process than in the first type of interpolating operation process.

* * * * *